(12) United States Patent
Prebeck

(10) Patent No.: US 7,631,494 B2
(45) Date of Patent: Dec. 15, 2009

(54) HYDROSTATIC TRANSMISSION OF A HYDROSTATIC-MECHANICAL POWER DISTRIBUTION TRANSMISSION

(75) Inventor: Stefan Prebeck, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 411 days.

(21) Appl. No.: 11/716,888

(22) Filed: Mar. 12, 2007

(65) Prior Publication Data

US 2007/0238577 A1 Oct. 11, 2007

(30) Foreign Application Priority Data

Mar. 15, 2006 (DE) .................. 10 2006 011 804

(51) Int. Cl.
*F16D 31/02* (2006.01)
(52) U.S. Cl. ............... 60/327; 60/394; 60/464
(58) Field of Classification Search .......... 60/327, 60/328, 394, 464, 468, 489
See application file for complete search history.

(56) References Cited

U.S. PATENT DOCUMENTS

| 4,887,428 | A | * | 12/1989 | Iino | ................. | 60/468 |
| 5,964,090 | A | * | 10/1999 | Nam et al. | ............. | 60/422 |
| 7,506,717 | B2 | * | 3/2009 | Tatsuno et al. | ........... | 60/464 |

FOREIGN PATENT DOCUMENTS

| DE | 195 25 823 A1 | 3/1996 |
| DE | 43 96 170 T1 | 10/1996 |

* cited by examiner

*Primary Examiner*—Michael Leslie
(74) *Attorney, Agent, or Firm*—Davis & Bujold, P.L.L.C.

(57) ABSTRACT

A hydrostatic transmission of a hydrostatic-mechanical power distribution transmission in which the high-pressure limiting valves in the hydrostatic transmission are eliminated or adjusted to enable a working pressure higher than the working pressure on which the maximum pressure is based. For short time intervals, a pressure substantially higher than the pressure on which the maximum pressure is based under constant load of the hydrostatic transmission, can be adjusted. The hydrostatic transmission has high-pressure sensors connected with the control of the hydrostatic-mechanical power distribution transmission.

3 Claims, 1 Drawing Sheet

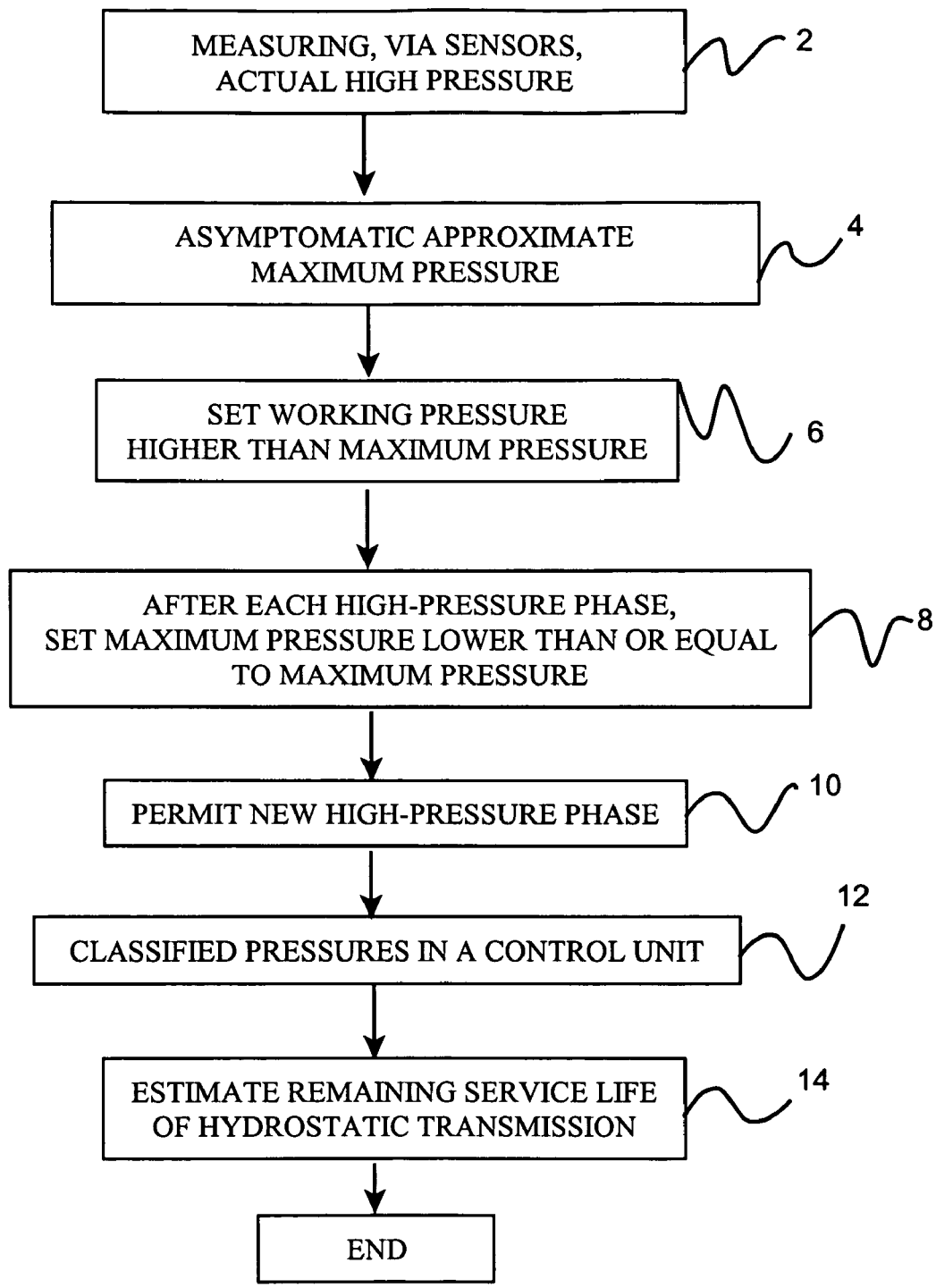

HYDROSTATIC TRANSMISSION OF A HYDROSTATIC-MECHANICAL POWER DISTRIBUTION TRANSMISSION

This application claims priority from German patent application serial no. 10 2006 011 804.9 dated Mar. 15, 2006.

FIELD OF THE INVENTION

The instant invention concerns a hydrostatic transmission of a hydrostatic-mechanical power distribution transmission. The invention concerns also a method for operating the inventive hydrostatic transmission of a hydrostatic-mechanical power distribution transmission.

BACKGROUND OF THE INVENTION

According to the prior art, commercial agricultural vehicles comprise a hydrostatic-mechanical powerdistribution transmission consisting of a continuously variable hydrostatic transmission with a unit having a variable volume, a constant volume, a summarizing transmission and a range-change transmission with several shiftable gears. The rotational speeds and torques of the hydrostatic transmission and the prime mover are synchronized by the summarizing transmission. By coupling the output shaft of the summarizing transmission with the output shaft, via different spur gear sets with the aid of gear clutches, different gears can be selected. Compared to mechanical transmissions, continuously variable transmissions have the advantage that in every driving mode it is possible to drive, at optimal motor rotational speeds, with no tractional interruptions occurring when shifting.

The hydrostatic transmissions in hydrostatic-mechanical power distribution transmissions have, as a rule, high-pressure limiting valves which limit the maximum working pressure of the hydrostatic transmission. The hydrostatic transmission is thereby protected from overstressing caused by too high of a working pressure.

Limitation of the high pressure also limits the torque over the hydrostatic branch of the power distribution transmission and thus also the traction of the vehicle. While the motor is running, opening of the valves for discharging the high pressure is felt in the vehicle by stopping the vehicle. In order to prevent unexpected stopping of the vehicle by the driver, in many applications this driving mode is asymptotically approximated by an active delay of the vehicle, thus communicating to the driver that the vehicle has reached its traction limit.

From the prior art it is known to mathematically determine the hydrostatic pressure via the ratio of the real and the theoretical rotational speed ratio (that is, from the hydrostatic ratio). For this purpose, characteristic fields of the hydrostatic leakage, depending on working pressure and other physical parameters is used. Due to manufacturing tolerances and wear resulting from operation, even despite calibrations the mathematical results disadvantageously diverge from the positively existing working pressure.

In agricultural and municipal uses, there are cases in which a very strong torque might be needed for a few seconds even though it is not required to drive steadily and directly at the high pressure limit. This can be the case, for example, when heaving a freight car in shunting operation or when overcoming an obstacle in the field.

In the hydrostatic-mechanical power distribution transmissions existing at present, these uses are not covered due to the high pressure limiting valves which are designed for the permanent load of the hydrostatic transmission. On the other hand, the hydrostatic transmission can work, for a short time, with a definitely higher working pressure. This is under the supposition that the parts can subsequently recover. The torques increases for a short time are no problem for the gearings in the transmission since, at the present time, transmissions are designed based on running smoothly, the certainty of cog failure is generally low.

SUMMARY OF THE INVENTION

The problem on which this invention is based is to modify a hydrostatic transmission of a hydrostatic-mechanical distribution transmission such that the intervals pressure can be adjusted, for a short time, to be substantially higher than that the pressure basis of the maximum pressure during a permanent load of the hydrostatic transmission.

To be further outlined is a method for operating the inventive hydrostatic-mechanical power distribution transmission. The method must especially provide for the safe operation of the inventive hydrostatic-mechanical power distribution transmission with a pressure higher than the pressure set as the maximum pressure during constant load of the hydrostatic transmission.

DETAILED DESCRIPTION OF THE PREFERRED EMBODIMENTS

A hydrostatic transmission of a hydrostatic-mechanical power distribution transmission is accordingly proposed in which the high-pressure limiting valves, in the hydrostatic transmission, are eliminated or adjusted to a level that makes possible a working pressure above the working pressure, set as the maximum pressure under during constant load of the hydrostatic transmission. According to the invention, the hydrostatic transmission, in addition, has high-pressure sensors connected to the control of the hydrostatic-mechanical power distribution transmission.

BRIEF DESCRIPTION OF THE DRAWINGS

The invention will now be described, by way of example, with reference to the accompanying sole FIGURE of the drawing which shows the method.

As illustrated in sole FIGURE, the first step 2 includes measuring via, the high-pressure sensors, the actual high pressure in the hydrostatic transmission, it is possible by the control connected with the high-pressure sensors to limit the pressure, via the power distribution. At the second step 4, the maximum pressure of the hydrostatic transmission, without the high-pressure limiting valves, is asymptomatically approximated.

According to the third step 6, during a high-pressure phase it is possible to adjust, for an adequately briefly defined time interval, a substantially higher pressure than the pressure set as the maximum pressure (high-pressure phase) during constant load of the hydrostatic transmission. According to the fourth step 8, a recovery phase, with a pressure lower than the maximum pressure or equal to the maximum pressure, follows after each high-pressure phase. The required recover phases can be precisely monitored, via a timer, taking into account the actual working pressures, measured in the hydrostatic transmission by the high-pressure sensors and, after termination of the recover phase, a new high-pressure phase can again be freely achieved at step 10.

According to the invention if there is a failure of the high-pressure sensor(s), a high pressure can be calculated via a ratio of the actual hydrostat input and the hydrostat output rotational speeds and the difference between the actual and the theoretical rotational speed ratio, taking into account the characteristic fields of hydrostatic leakage, depending on the working pressure and other parameters, and adding an offset being the calculation value to take into account the inaccuracies of the calculation.

According to step 12, the measured high pressures in the hydrostatic transmission, the same as the length of the high-pressure phases and the time intervals of the high-pressure phases relative to each other, can be classified in a control unit and, as step 14, used in an estimation concerning the remaining service life of the hydrostatic transmission. If the hydrostatic transmission in a vehicle is over proportionally stressed with regard to the classification, it can be recommended to the driver, by information from a display, that the hydrostat has to be checked and, if necessary, replaced.

I claim:

1. A method of operating a hydrostatic transmission of a hydrostatic-mechanical power distribution transmission comprising high-pressure limiting valves which enable an actual working pressure to exceed a working pressure limit, set as a maximum pressure during a constant load of the hydrostatic transmission, and at least one high-pressure sensor communicating with a hydrostatic-mechanical power distribution transmission control, the method comprising the steps of:
   measuring, via the at least one high-pressure sensor, the actual working pressure in the hydrostatic transmission during power distribution;
   asymptotically approximating the hydrostatic transmission to the maximum pressure;
   increasing the actual working pressure, via the power distribution transmission control which communicates with the at least one high-pressure sensor, during a high-pressure phase for a short defined time interval such that the actual working pressure is greater than the working pressure limit set as the maximum pressure during the constant load of the hydrostatic transmission;
   after each high-pressure phase, decreasing the actual working pressure during a recovery phase such that the actual working pressure is lower than the maximum pressure, and monitoring the recovery phase via a timer and taking into consideration the actual working pressure in the hydrostatic transmission as measured by the at least one high-pressure sensor; and
   after termination of the recovery phase, initiating a high-pressure restoring phase.

2. A method of operating a hydrostatic transmission of a hydrostatic-mechanical power distribution transmission comprising high-pressure limiting valves which enable an actual working pressure to exceed a working pressure limit, set as a maximum pressure during a constant load of the hydrostatic transmission, and at least one high-pressure sensor communicating with a hydrostatic-mechanical power distribution transmission control, the method comprising the steps of:
   measuring, via the at least one high-pressure sensor, the actual working pressure in the hydrostatic transmission during power distribution;
   asymptotically approximating the hydrostatic transmission to the maximum pressure;
   limiting the actual working pressure via the power distribution transmission control which communicates with the at least one high-pressure sensor;
   in the event that the at least one high-pressure sensor fails;
   calculating a high-pressure value from a ratio of an actual hydrostatic input rotational speed, an actual hydrostatic output rotational speed, a difference between a real rotational speed and a theoretical rotational speed ratio, and at least one characteristic field of hydrostatic leakage depending on the actual working pressure; and
   adding an offset to the calculated high-pressure value to account for any possible inaccuracy of the calculated high-pressure value.

3. A method of operating a hydrostatic transmission of a hydrostatic-mechanical power distribution transmission comprising high-pressure limiting valves which enable an actual working pressure to exceed a working pressure limit, set as a maximum pressure during a constant load of the hydrostatic transmission, and at least one high-pressure sensor communicating with a hydrostatic-mechanical power distribution transmission control, the method comprising the steps of:
   measuring, via the at least one high-pressure sensor, the actual working pressure in the hydrostatic transmission during power distribution;
   asymptotically approximating the hydrostatic transmission to the maximum pressure;
   limiting the actual working pressure via the power distribution transmission control which communicates with the at least one high-pressure sensor;
   classifying, in a control unit, the measured actual working pressure in the hydrostatic transmission, time intervals of each high-pressure phase, and time intervals of the high-pressure phases relative to each other; and
   employing the measured actual working pressure in the hydrostatic transmission, the time intervals of the high-pressure phases, and the time intervals of the high-pressure phases relative to each other to estimate a remaining service life of the hydrostatic transmission.

* * * * *